(12) United States Patent
Jue et al.

(10) Patent No.: US 6,617,937 B2
(45) Date of Patent: Sep. 9, 2003

(54) MICROCONTROLLER AVAILABLE FOR REMOTE TRANSMISSION

(75) Inventors: Yia-Min Jue, Hsinchu (TW); Wen-Yuh Shieh, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 0 days.

(21) Appl. No.: 10/082,102

(22) Filed: Feb. 26, 2002

(65) Prior Publication Data

US 2002/0167370 A1 Nov. 14, 2002

(30) Foreign Application Priority Data

May 11, 2001 (TW) ........................................ 90111522 A

(51) Int. Cl.[7] ................................................. H03K 7/08
(52) U.S. Cl. ........................ 332/109; 332/117; 375/238
(58) Field of Search ................................. 725/139, 148, 725/151, 118; 332/109, 110, 117–119; 375/256, 238, 300, 302

(56) References Cited

U.S. PATENT DOCUMENTS

| 3,478,344 | A | * | 11/1969 | Schwitzgebel et al. .... 340/7.63 |
| 4,275,385 | A | * | 6/1981 | White ................... 340/825.49 |
| 5,282,028 | A | * | 1/1994 | Johnson et al. ............ 725/139 |
| 5,528,264 | A | * | 6/1996 | Kautzer et al. ............ 345/158 |

* cited by examiner

*Primary Examiner*—Minh Nguyen
(74) *Attorney, Agent, or Firm*—Rosenberg Klein & Lee

(57) ABSTRACT

An integrated circuit includes a frequency prescaler for producing an infrared transmission carrier; a duty-cycle selector for adjustably setting the carrier's duty cycles; as well as a pulse generator and hardware modulator to generate a signal of desired waveform for infrared transmission. The integrated circuit also includes a multiplexer for receiving the signal of desired waveform from the hardware modulator and a data output signal in producing a selected output signal responsive to a control signal. The integrated circuit further includes an output buffer coupled to the multiplexer for transferring data to an output terminal.

5 Claims, 6 Drawing Sheets

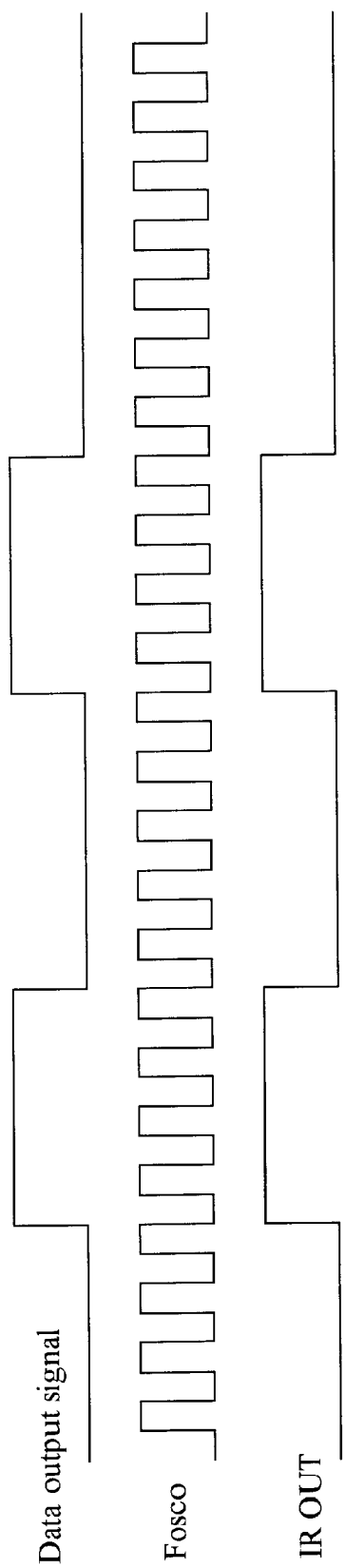

MICROCONTROLLER AVAILABLE FOR REMOTE TRANSMISSION

FIELD OF THE INVENTION

The present invention relates generally to an improved architecture of an integrated circuit (IC), and more particularly, to an integrated circuit with remote transmission function.

BACKGROUND OF THE INVENTION

For recent years high-tech products have already been part of people's live, for example, mobile telephone, remotely controlled lock, sensor, all these products are equipped with infrared (IR) apparatus for signal transmission. The combination of infrared circuit and integrated circuit in applications is commend for circuit design today, however the weak point is that it is necessary to add a complex carrier circuit into the system in addition to the original integrated circuit, the size and cost thereby are increased.

To solve the problem described above, the present invention discloses a software controlled infrared transmission technology, by which the carrier and the transmission of infrared signals are controlled by the software in a microprocessor, and thus only some preset parameters need to be inputted for control registers, as a result, it not only saves the time for circuit design but also the output waveform can be prepared as of the designer desired.

SUMMARY OF THE INVENTION

The present invention is directed to an integrated circuit with remote transmission function, in which a main circuit divides the oscillation frequency first and selects to be carrier mode or not, and then determines the external application circuit by an internal circuit and a software and selects the mode of output pin by a multiplexer, so as to make the peripheral circuit more easier to be designed and smaller in size, and therefore saves cost and time for circuit design and improves the working efficiency.

One object of the present invention is an integrated circuit with infrared transmission, in which the function of a carrier circuit is included in the integrated circuit to make the design and assembly of the infrared apparatus easier.

Another object of the present invent is integrated circuit for infrared transmission without additional carrier circuit to save the cost of the infrared apparatus and shrink the size.

Yet another object of the present invent is an integrated circuit with infrared transmission, in which a mode select signal for the control of a multiplexer in the integrated circuit is employed for the pin of the integrated circuit applicable for infrared apparatus and general input/output port.

Still another object of the present invention is an integrated circuit for users to adjust the duty cycle of an output carrier by use of a signal to control the value of a register in the integrated circuit when operated with the output carrier, such that the users can define the transmission protocol to improve the reliability of the carrier transmission.

Yet still another object of the present invent is an integrated circuit with pulse width modulation (PWM) transmission, in which a select signal to control the value of a register in the integrated circuit is employed for PWM transmission to make the applications wider.

Also still another object of the present invent is an integrated circuit with frequency synchronization, in which a select signal to control the value of a register in the integrated circuit is employed for a stable frequency provided by an output pin of the integrated circuit to synchronize the operations for the applications of two frequencies and more by means of a same input frequency.

Yet still another object of the present invent is an integrated circuit available for high frequency operation, in which infrared transmission is selected for high speed transmission between fixed positions, thereby the data transmission speed is increased, the assembly of peripheral circuits is easier, and the cost of the circuit design and parts is reduced.

BRIEF DESCRIPTION OF THE DRAWINGS

For a better understanding of the present invention, reference may be had to the following description of exemplary embodiments thereof, considered in conjunction with the accompanying drawings, in which:

FIGS. 3A to 3D are timing diagrams of the output signal and its related signals the integrated circuit with infrared transmission function according to the present invention.

DETAILED DESCRIPTION OF THE PREFERRED EMBODIMENTS

Figure 1:
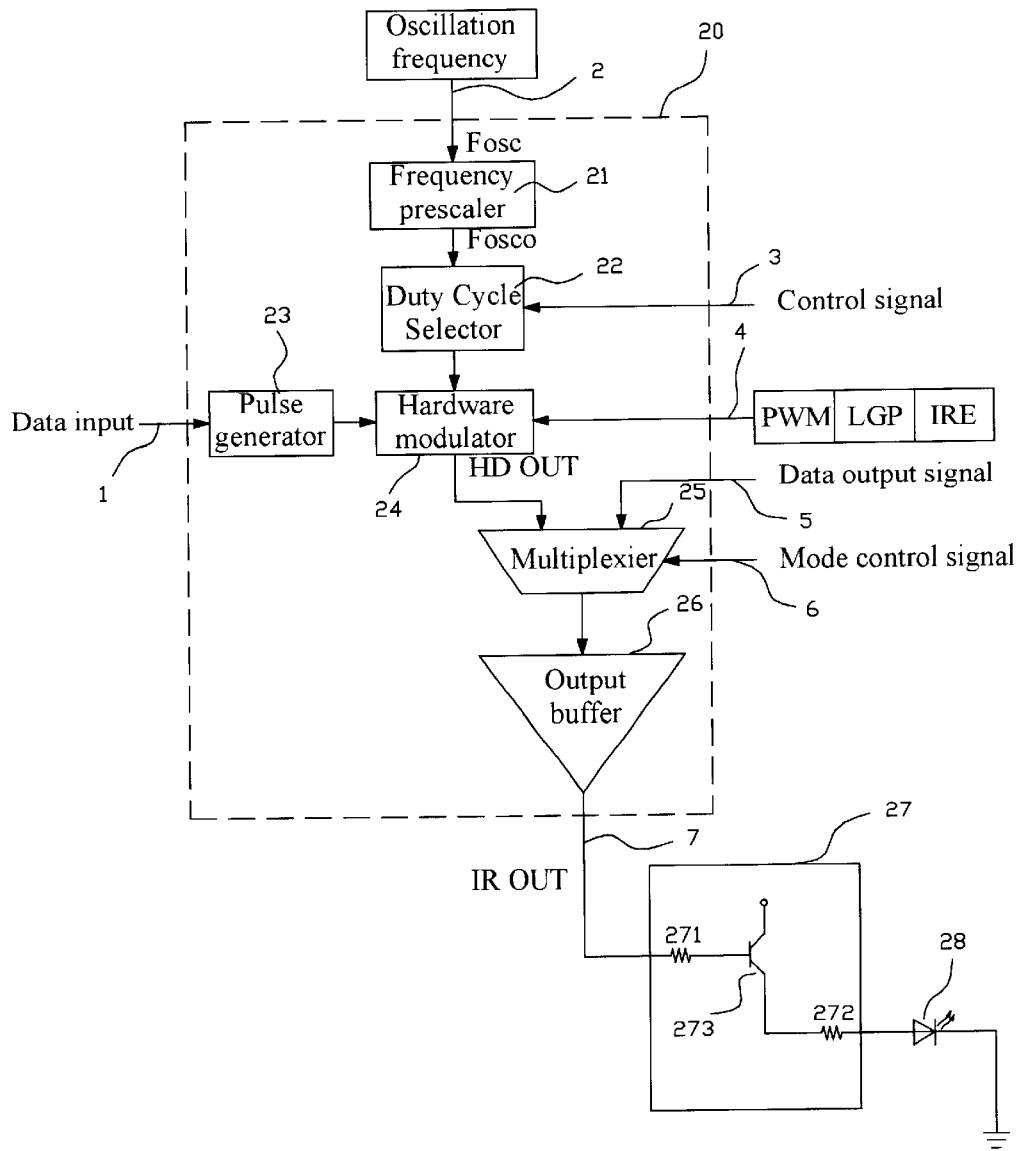
FIG. 1 is a diagram showing the architecture of an infrared transmission apparatus according to the present invention.

FIG. 1 is a diagram to show the architecture of an integrated circuit with infrared transmission according to the present invention. As shown in FIG. 1, an integrated circuit 20 for remote transmission comprises a frequency prescaler 21, a duty cycle selector 22, a hardware modulator 24, a pulse generator 23, a multiplexer 25, and an output buffer 26.

At first an oscillation frequency Fosc is inputted to the frequency prescaler 21 by its input terminal and divided by the frequency prescaler 21 to produce a carrier Fosco for infrared transmission. The duty cycle selector 22 adjusts the duty cycle of the carrier from the prescaler 21 and generates the desired carrier for users in association with the duty cycle for output waveform preset by the users. Meanwhile to coordinate with the pulse generator 23, the control register (not shown) inputs the desired values of the low time and the high time to the pulse generator 23. The hardware modulator 24 respectively receives the carrier of a duty cycle from the duty cycle selector 22 with one input terminal and the output signal from the pulse generator 23 with another input terminal, and then generates a signal HDOUT of desired waveform for infrared transmission after the logic operation thereof. The multiplexer 25 respectively receives the output signal HDOUT generated by the hardware modulator 24 with one terminal and the data output signal Data with another terminal, and then send out a signal with its output terminal under the control of a select control signal (not shown) to determine what kind of the signal to be outputted. The output buffer 26 is connected with its input terminal to the output terminal of the multiplexer 25 and transmits the data to the output terminal of the integrated circuit. This way there can be generated a plurality of data output signals for various types of transmissions, such as a continuous carrier of 38 kHz continuously transmitted to one input terminal of the multiplexer 25 whose another terminal receives a data output signal DATA, such that the user can send out the data from the output terminal through the output buffer 26 only by control the data providing of the data output signal DATA with the transmission signal through the circuit disclosed above. Since most of the circuits are built in the integrated circuit 20, it only needs to connect the input terminal of the integrated circuit 20 with the infrared receiver 18 of the infrared transmission apparatus. A bias circuit 27 includes two resistors 271 and 272, and a transistor 273. One terminal of the resistor 271 is connected with the output terminal 7 of the integrated circuit 20, and the other terminal is connected with the base of the transistor 273. The emitter of the transistor 273 is connected with a voltage Vcc. One terminal of the resistor 272 is connected with the collector of transistor 273, and the other terminal is connected with the infrared light emitting diode (LED) 28 for ready to use. This manner the circuit design of an infrared transmission apparatus becomes easier to be combined with the circuit design of an integrated circuit, the size is smaller, the assembly is easier, the working efficiency is improved, and the cost is reduced.

For general applications, the carrier frequency for the transmission and receiving by the infrared light emitting diode 28 is not very high such that the oscillation frequency Fosc for the frequency prescaler 21 can be produced by an internal RC oscillator, and thus all of the pins on the integrated circuit 20 can be used for other functions, that saves more costs than that of a crystal oscillator which needs two pins and that of an external RC oscillator which needs one pin.

For general applications, the carrier frequency for the transmission and receiving by the infrared light emitting diode 17 is not very high such that the oscillation frequency for the frequency prescaler can be produced by an internal RC oscillator, and thus all of the pins on the integrated circuit 10 can be used for other functions, that saves more costs than that of a crystal oscillator which needs two pins and that of an external RC oscillator which needs one pin.

Figure 2:
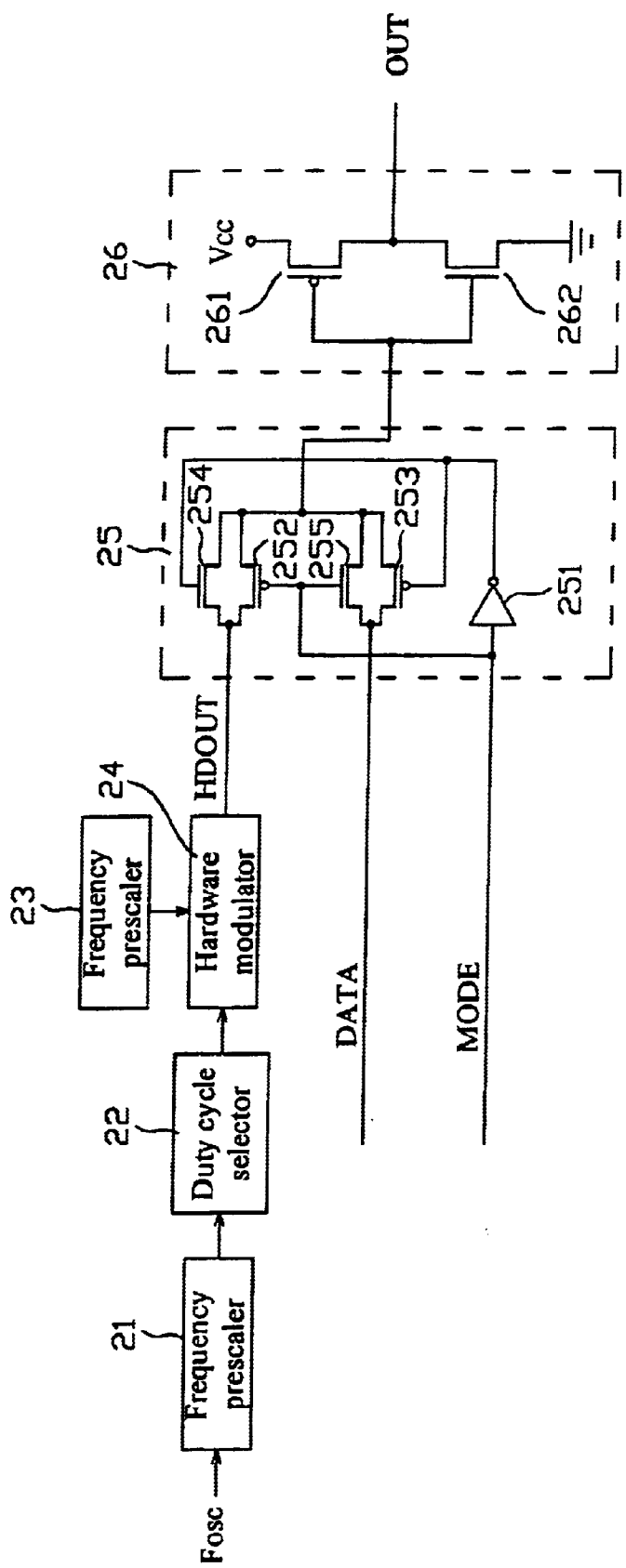
FIG. 2 is a schematic view of a preferred embodiment integrated circuit shown in FIG. 1.

FIG. 2 is a schematic view of a preferred embodiment of the integrated circuit with remote transmission function as shown in FIG. 1, and only the differences from FIG. 1 are described for simplification. Fosc is the input oscillation frequency, and Fosco is the signal of a waveform, i.e., the output carrier, produced by the frequency prescaler 21. HDOUT is the signal of a waveform produced by the hardware modulator 24. The multiplexer 25 includes two P type field-effect transistors (FET) 252 and 254, two N type field-effect transistors 253 and 255, and an inverter 251. The carrier HDOUT produced by the hardware modulator 13 is inputted to the sources of the P type field-effect transistors 252 and 254 and N type field-effect transistors 253 and 255, and the drains of the P type field-effect transistors 252 and 254 and N type field-effect transistors 253 and 255 are connected to the output buffer 26. The gates of the P type field-effect transistor 252 and N type field-effect transistor 255 are connected to the output of the inverter 251, and the gates of the P type field-effect transistor 254 and N type field-effect transistor 253 are connected to the input terminal of the inverter 251. The multiplexer 25 controls what kind of signal to be sent out by use of a mode select control signal MODE. When the mode select control signal MODE is logic 1, the multiplexer 25 selects the data output signal DATA for the output signal, on the contrary, when the mode select control signal MODE is logic 0, the multiplexer 25 selects the carrier HDOUT produced by the hardware modulator 13 for the output signal. The output buffer 26 includes a P type field-effect transistor 261 and an N type field-effect transistor 262. A voltage Vcc is connected with the source of the P type field-effect transistor 261, and the source of the N type field-effect transistor 262 is grounded. The gates of the P type field-effect transistor 261 and N type field-effect transistor 262 receive the output signal of the multiplexer 26, and the drains of the P type field-effect transistor 261 and N type field-effect transistor 262 send out the output signal from the output terminal IR OUT of the integrated circuit.

For wireless transmission it has differences in consideration of environment, noise and distance, FIGS. 3A to 3D are the timing diagrams of the output signal and their related signals from the integrated circuit with infrared transmission function when the output buffer 25 is in normal output situation.

As shown in FIG. 3A, when the mode select control signal Mode is fixed on 1, the output terminal OUT of the integrated circuit sends out an output signal DATA, and it can be thus used as a normal data output terminal. For short distance transmissions, the oscillation frequency of the external apparatus at fixed position can be increased to enhance the transmission speed therebetween, and the frequency of the external apparatus not at fixed position can be increased to 445 kHz or 1 MHz to increase the transmission speed therebetween. When the mode select control signal determines an infrared output signal and the data output signal is disabled, it is combined with the output waveform from the IR OUT pin, that is, the control register determines whether a carrier is needed for the output.

Figure 3B:
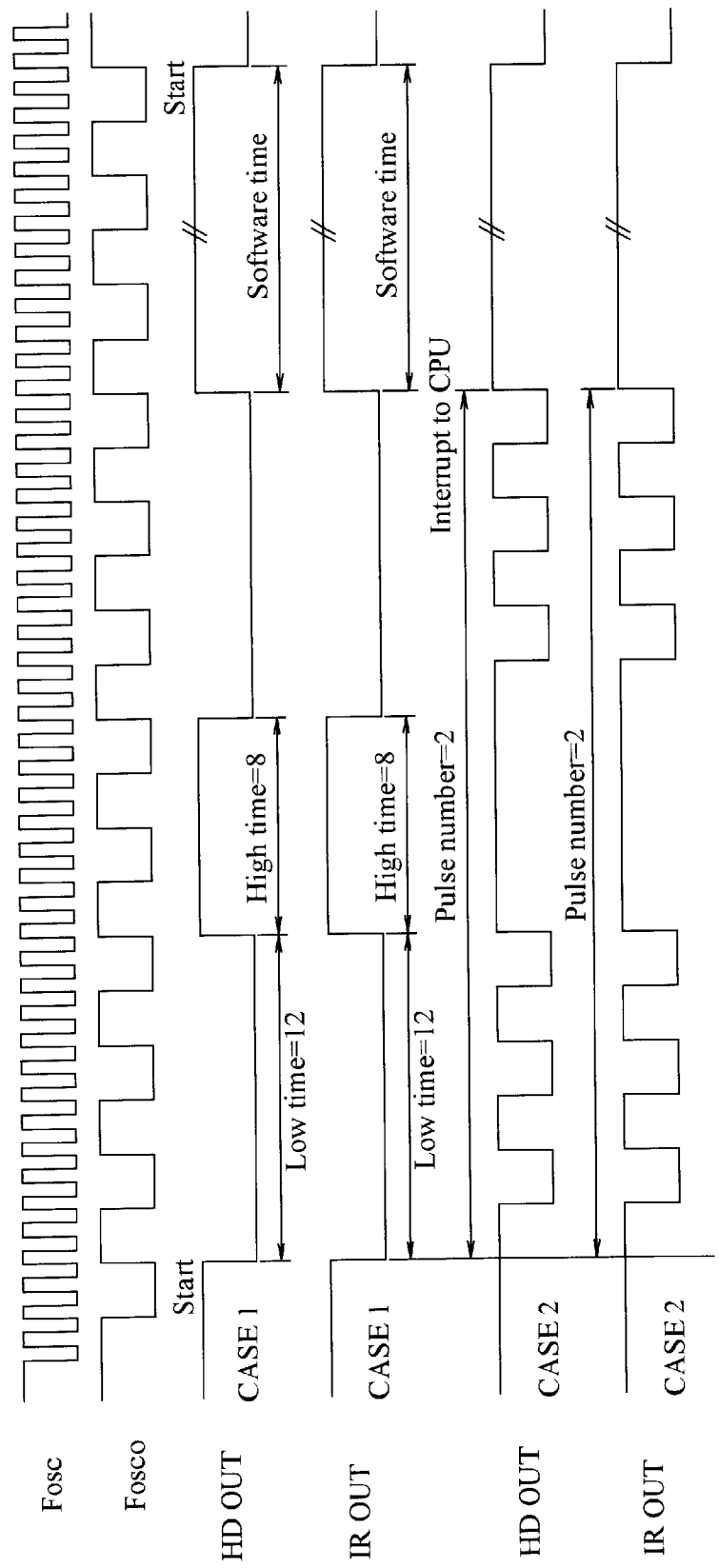

As shown in FIG. 3B, when the select control signal MODE is an infrared output signal and the data output signal is disabled, it can be combined with the infrared output waveform from the IR OUT (infrared output pin), that is, under the control of the control register to determine whether it needs a carrier or not for an output, for example, CASE 1 shows that a carrier is not added by the preset control register and the output of IR OUT produces the preset waveform depending on the previously stored value. If the transmission is between two fixed positions, and thus interference not under consideration, the circuit disclosed can be operated with high frequency, therefore, it improves the transmission speed, assembly of the peripheral circuit, and reduces the cost of circuit design and devices. CASE 2 shows that a carrier is added by the preset control register and the output of IR OUT is the previously stored value. For long distance transmission, the oscillation frequency of the external apparatus can be increased to 45 kHz for a stable transmission between two positions.

Figure 3C:
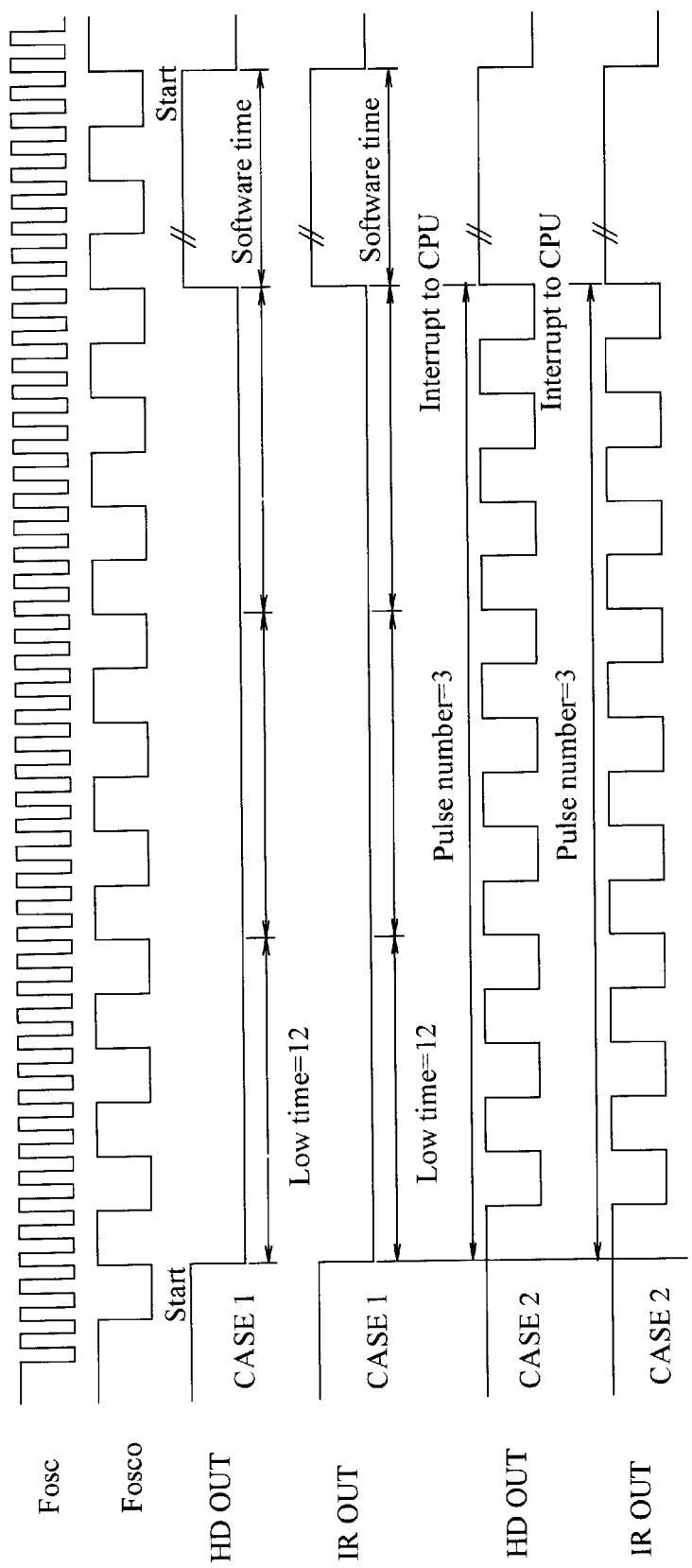

As shown for CASE 1 in FIG. 3C, if a long term signal with a fixed level is desired, it only needs to set the value of the control register in advance. For CASE 2, the signal in CASE 1 is combined with a carrier to produces a series of signals similar to a clock for a stable frequency.

Figure 3D:
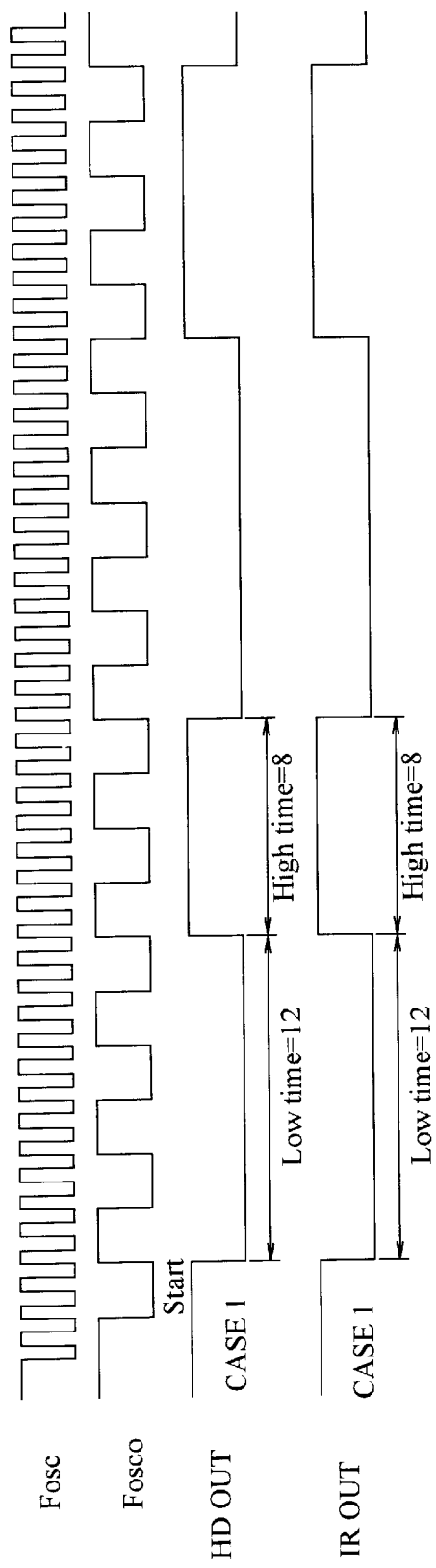

As shown in FIG. 3D, another unique characteristics of the present invention, the periods of low time and high time for the output port is set up in the control register in advance, and the desired wave length is sent out once the infrared output signal is enabled, which is pulse width modulated (PWM), and the periods of low time and high time can be changed when the program is running to adjust the waveform. The different ways to adjust the output waveform described above are convenient to modify the integrated circuit design, and makes it easier to combine the circuit of infrared transmission apparatus and the integrated circuit when designing, that improves the working efficiency and reduces the cost.

According to the above description, it is obvious that the present invention is directed to an integrated circuit with infrared transmission function, which divides the oscillation frequency and selects the duty cycle to produces the carrier, in association with selection and control by use of the multiplexer, so as to makes the circuit design of infrared transmission easier and the size smaller, meanwhile improves the working efficiency and reduces the costs.

What is claimed is:

1. An integrated circuit with infrared transmission function comprising:

a frequency prescaler for receiving an oscillation frequency and dividing said oscillation frequency to produce a carrier for infrared transmission;

a duty cycle selector for receiving said carrier produced by said frequency prescaler and adjusting a duty depending on a desired duty cycle to produce a carrier of a duty cycle for infrared transmission;

a pulse generator for receiving low time and high time values from an external control register through an input terminal;

a hardware modulator for respectively receiving said carrier of said duty cycle from said duty cycle selector and an output signal from said pulse generator and generating a signal of a desired waveform for infrared transmission after a logic operation thereof;

a multiplexer for respectively receiving said signal of said desired waveform from said hardware modulator and a data output signal and producing a selected output signal under control of a select control signal; and an output buffer connected to an output terminal of said multiplexer for transferring data to an output terminal of said integrated circuit.

2. An integrated circuit according to claim 1 wherein said output buffer has an output pin connected to an infrared LED.

3. An integrated circuit according to claim 1 wherein said integrated circuit is a general type microcontroller.

4. An integrated circuit according to claim 1 wherein said multiplexer controls selection of said data output signal by said select control signal for an output pin of said output buffer applicable for general input/output port in addition to infrared transmission.

5. An integrated circuit according to claim 1 wherein said frequency and duty cycle of said carrier is adjustable for desired application.

* * * * *